(12) United States Patent
Shane

(10) Patent No.: US 10,144,157 B2
(45) Date of Patent: *Dec. 4, 2018

(54) IN-MOLD-COATED AUTOMOTIVE INTERIOR AND OTHER PRODUCTS, AND METHODS FOR MANUFACTURING SAME

(71) Applicant: Kyle Shane, Wadesville, IN (US)

(72) Inventor: Kyle Shane, Wadesville, IN (US)

(73) Assignee: Red Spot Paint & Varnish Co., Inc., Evansville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/402,877

(22) Filed: Jan. 10, 2017

(65) Prior Publication Data
US 2017/0144335 A1 May 25, 2017

Related U.S. Application Data

(60) Continuation of application No. 15/017,795, filed on Feb. 8, 2016, now Pat. No. 9,539,745, which is a
(Continued)

(51) Int. Cl.
| | |
|---|---|
| *B29C 37/00* | (2006.01) |
| *B29C 67/24* | (2006.01) |
| *C08J 5/00* | (2006.01) |
| *C09D 133/08* | (2006.01) |
| *B29K 75/00* | (2006.01) |
| *B29K 105/04* | (2006.01) |
| *B29L 31/30* | (2006.01) |

(Continued)

(52) U.S. Cl.
CPC ........ *B29C 37/0032* (2013.01); *B29C 67/246* (2013.01); *C08J 5/00* (2013.01); *C09D 133/08* (2013.01); *B29C 2037/0035* (2013.01); *B29K 2033/12* (2013.01); *B29K 2075/00* (2013.01); *B29K 2105/0085* (2013.01); *B29K 2105/04* (2013.01); *B29K 2105/24* (2013.01); *B29L 2009/005* (2013.01); *B29L 2031/3005* (2013.01); *C08J 2375/04* (2013.01); *C08J 2433/08* (2013.01); *Y10T 428/24355* (2015.01); *Y10T 428/24438* (2015.01); *Y10T 428/249987* (2015.04); *Y10T 428/2839* (2015.01); *Y10T 428/31573* (2015.04); *Y10T 428/31576* (2015.04)

(58) Field of Classification Search
CPC .................................................. B29C 37/0032
See application file for complete search history.

(56) References Cited

U.S. PATENT DOCUMENTS

| | | | |
|---|---|---|---|
| 4,289,811 A | 9/1981 | Shelley, Jr. | |
| 4,422,996 A * | 12/1983 | Navin ................. | B29C 37/0028 264/250 |

(Continued)

FOREIGN PATENT DOCUMENTS

| | | |
|---|---|---|
| JP | 54086526 | 7/1979 |
| JP | 2001138355 | 5/2001 |
| JP | 2001200129 | 7/2001 |

*Primary Examiner* — William P Watkins, III
(74) *Attorney, Agent, or Firm* — King & Partners, PLC

(57) ABSTRACT

Described are in-mold coated products such as vehicular components, in-mold coating methods, and in-mold coating compositions, involving the use of aqueous acrylic copolymer dispersions, desirably self-crosslinking.

6 Claims, 1 Drawing Sheet

Related U.S. Application Data continuation of application No. 14/667,491, filed on Mar. 24, 2015, now Pat. No. 9,296,130, which is a continuation of application No. 12/137,780, filed on Jun. 12, 2008, now Pat. No. 8,986,593, which is a division of application No. 11/231,568, filed on Sep. 21, 2005, now Pat. No. 7,390,555, which is a continuation of application No. 10/308,329, filed on Dec. 3, 2002, now abandoned.

(60) Provisional application No. 60/338,597, filed on Dec. 3, 2001.

(51) Int. Cl.
*B29L 9/00* (2006.01)
*B29K 33/00* (2006.01)
*B29K 105/00* (2006.01)
*B29K 105/24* (2006.01)

(56) References Cited

U.S. PATENT DOCUMENTS

| | | |
|---|---|---|
| 4,636,546 A | 1/1987 | Chao |
| 4,656,217 A | 4/1987 | Sugiura et al. |
| 5,284,900 A | 2/1994 | Izubayashi et al. |
| 5,611,881 A | 3/1997 | Kimura et al. |
| 5,700,312 A | 12/1997 | Fausnight et al. |
| 5,885,662 A | 3/1999 | Gardner, Jr. |
| 6,166,150 A | 12/2000 | Wilke et al. |
| 6,455,147 B1 | 9/2002 | Mizuno et al. |
| 6,515,042 B2 | 2/2003 | Kriessmann et al. |
| 6,541,114 B2 | 4/2003 | Katou et al. |
| 6,579,932 B1 | 6/2003 | Schipper et al. |
| 6,624,276 B2 | 9/2003 | Lamers et al. |
| 8,986,593 B2 | 3/2015 | Shane |
| 9,296,130 B2 | 3/2016 | Shane |
| 9,539,745 B2 | 1/2017 | Shane |

* cited by examiner

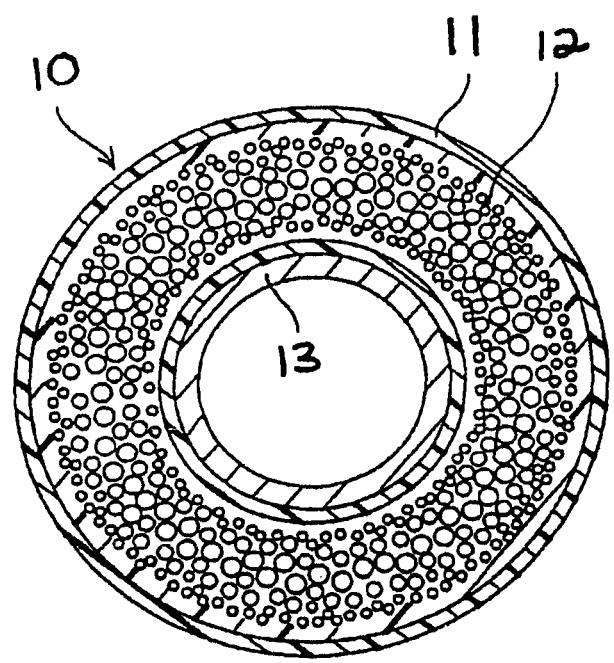

IN-MOLD-COATED AUTOMOTIVE INTERIOR AND OTHER PRODUCTS, AND METHODS FOR MANUFACTURING SAME

This application is a continuation of U.S. application Ser. No. 15/017,795, filed Feb. 8, 2016, now U.S. Pat. No. 9,539,745, entitled "In-Mold-Coated Automotive Interior And Other Products, And Methods For Manufacturing Same," which is a continuation of U.S. application Ser. No. 14/667,491, filed Mar. 24, 2015 now U.S. Pat. No. 9,296,130, entitled "In-Mold-Coated Automotive Interior And Other Products, And Methods For Manufacturing Same," which is a continuation of U.S. application Ser. No. 12/137,780, filed Jun. 12, 2008, now U.S. Pat. No. 8,986,593, entitled "In-Mold-Coated Automotive Interior And Other Products, And Methods For Manufacturing Same," which is a divisional of U.S. patent application Ser. No. 11/231,568 filed Sep. 21, 2005, now U.S. Pat. No. 7,390,555 entitled "In-Mold-Coated Automotive Interior And Other Products, And Methods For Manufacturing Same," which is a continuation of U.S. patent application Ser. No. 10/308,329 filed Dec. 3, 2002, now abandoned, which claims the benefit of U.S. Provisional Patent Application, Ser. No. 60/338,597 filed Dec. 3, 2001, each of which is hereby incorporated by reference in its entirety.

BACKGROUND

The present invention relates generally to in-mold-coated products such as automotive interior articles including a decorative or protective coating atop an underlying foam, film or other plastic material. In one particular embodiment, the invention relates to an automotive interior article prepared by in-mold coating, including a polyurethane substrate covered with an in-mold coating containing a water-dispersible, self-crosslinked acrylic polymer composition.

As further background, automotive interior articles such as instrument panels, door panels, armrests, headrests, floor consoles, knee bolsters, steering wheels, and glove compartment doors are often constructed by applying a soft decorative covering over a rigid substrate mountable in an automobile vehicular body, with a cellular polyurethane padding interposed between the decorative covering and rigid substrate. A variety of in-mold coating compositions and systems have been proposed for use in preparing such automotive components. However, the coating systems proposed and used to date present a number of limitations. For example, many such systems require the use of solventborne compositions, which present environmental concerns relative to emissions. In addition, there is a trend to use polyurethane-based in-mold coatings to cover polyurethane substrates because it is widely believed that such a system is necessary for good adhesion of the decorative coating to the substrate.

In view of the background in this area, needs remain for improved in-mold coating compositions, in-mold coating methods, and in-mold-coated automotive articles. The present invention addresses these needs.

SUMMARY OF THE INVENTION

It has been discovered that highly advantageous in-mold coated articles, in-mold coating methods, and in-mold coating compositions can be provided involving the use of aqueous acrylic copolymer dispersions, desirably self-crosslinking. Accordingly, one embodiment of the present invention provides a method for manufacturing a vehicular component, such as an automotive interior article, including a polymer substrate and a coating thereon, comprising the steps of providing a mold having a mold surface, coating the mold surface with an aqueous, acrylic copolymer dispersion for forming said coating, passing into the mold a moldable polymer for forming the polymer substrate, and causing the copolymer dispersion and moldable polymer to cure. Particularly preferred embodiments of the invention involve the use of moldable polyurethane-forming polymer compositions in combination with aqueous acrylic copolymer dispersions to form the coating on the polyurethane article.

Another preferred embodiment of the present invention provides a vehicular component such as an automotive interior article that includes an inner polymer layer coated with an in-mold coating, wherein the in-mold coating is formed with an aqueous, acrylic copolymer dispersion, desirably a self-crosslinking acrylic copolymer dispersion.

Still another preferred embodiment of the present invention provides an in-mold coating composition for use in in-mold coating of vehicular components such as automotive interior articles, wherein the in-mold coating composition comprises an aqueous acrylic copolymer dispersion, desirably a self-crosslinking aqueous acrylic copolymer dispersion.

Another embodiment of the invention provides an elastomeric skin that includes a molded elastomeric polyurethane layer, and a coating formed in-mold with said elastomeric polyurethane layer and comprised of the reaction product of an aqueous acrylic copolymer dispersion.

Another embodiment of the invention provides a polyurethane product comprising a molded polyurethane elastomer foam substrate, and a coating adhered to the molded polyurethane elastomer foam substrate. The coating is formed in-mold with the polyurethane elastomer foam substrate and is comprised of the reaction product of an aqueous acrylic copolymer dispersion.

Another embodiment of the invention provides a method of manufacturing a coated, molded polyurethane elastomer product. The method includes providing a mold for making a product, the mold having a mold surface; coating the mold surface with an in-mold coating composition, said in-mold coating composition comprising a self-crosslinking, aqueous copolymer dispersion; passing a polyurethane elastomer composition into the mold and into contact with the in-mold coating composition; and causing the in-mold coating composition and polyurethane elastomer composition to cure, so as to form the coating for the vehicular component.

It is an object of the invention to provide improved methods for forming automotive interior articles and other similar vehicular components.

It is another object of the invention to provide improved, in-mold coated automotive interior articles and other similar vehicular components.

It is another object of the invention to provide improved in-mold coating compositions.

These and additional objects, as well as features and advantages of the invention will be apparent from the descriptions herein.

BRIEF DESCRIPTION OF THE DRAWINGS

FIG. 1 is a cross-sectional view of an in-mold-coated steering wheel of the present invention.

DESCRIPTION OF THE PREFERRED EMBODIMENTS

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

As disclosed above, the present invention provides in mold coating processes, in-mold coated products, including vehicular components such as automotive interior products, and compositions for the same. Preferred processes and products of the invention utilize aqueous, acrylic-based coating compositions to coat cellular or non-cellular polyurethane layers, surprisingly providing good adhesion of the coating directly to the polyurethane layer, and a coating exhibiting properties meeting stringent standards of the vehicular industries. Additional in-mold-coated products of the invention include molded products other than vehicular components, such as toys, balls, seat cushion or armrest cushion coverings for wheelchairs, furniture or the like, or building materials (e.g. artificial stone or stone panels), formed from foamed polyurethane compositions.

Preferred processes of the present invention will employ an in-mold coating technique. Thus, a first mold component presenting a mold surface will be employed. The first mold surface will define a configuration complementing the desired configuration of the outer layer of the automotive interior product. Typically, the mold surface will be grained to define a texture in the molded article, for example a simulated leather texture.

In accordance with the invention, a water-dispersed composition will be applied, for example sprayed, onto the mold surface. This water-dispersed composition will form a coating providing the outer layer of the desired product. Prior to application of the water-dispersed composition, the mold surface will usually be heated, for example to a temperature in the range of about 25° C. to about 110° C., more preferably about 40° C. to about 90° C. The selection of the particular mold temperature will be dependent upon several factors, including for example the particular article to be manufactured and manufacturing process, the properties of the water-dispersed composition, and the like. Given the disclosures herein, the selection of a suitable mold temperature will be within the purview of those ordinarily skilled in the art.

Processes of the invention may also employ compositions that facilitate release of the molded product from the mold, or so-called mold release agents. Such agents may include for example a microcrystalline wax, a silicon-based agent, or a stearate (each of these water- and/or organic solvent-borne), and can optionally be applied to the mold surface prior to the water-dispersed composition. Heating of the mold surface may then also evaporate the wax dispersants and leave a thin residue that does not collect in the grain detail or other texturing pattern of the mold surface.

Preferred processes of the invention will employ a water-dispersed or aqueous acrylic copolymerisate composition to form the outer layer of the automotive interior part. Preferred copolymerisate compositions will exhibit a core-and-shell structure. Suitable such compositions are described, for example, in Canadian Patent Application No. 2,286,855 published Apr. 19, 2001 (Vianova Resins Aktiengesellschaft).

Thus, particularly preferred compositions for forming the outer layer will comprise aqueous self-crosslinking copolymer dispersions ABC obtainable by free-radically initiated copolymerization in the first stage of a monomer mixture A comprising mass fractions in the mixture of A1 from 2 to 55%, preferably from 4 to 45% and, with particular preference, from 6 to 40% of olefinically unsaturated monomers having in each case at least one carbonyl group per molecule, A2 from 0.5 to 20%, preferably from 1 to 15% and, with particular preference, from 3 to 12% of α,β-olefinically unsaturated carboxylic acids or monoesters of α,β-olefinically unsaturated dicarboxylic acids with linear, branched or cyclic alcohols having 1 to 15 carbon atoms, A3 from 20 to 70%, preferably from 22 to 60% and, with particular preference, from 24 to 50% of olefinically unsaturated monomers selected from vinylaromatic compounds, n-butyl methacrylate and also alkyl esters of α,β-olefinically unsaturated carboxylic acids or dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, A4 from 10 to 60%, preferably from 15 to 50% and, with particular preference, from 20 to 45% of esters selected from alkyl esters of α,β-olefinically unsaturated carboxylic acids or dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and A5 from 0 to 25%, preferably from 2 to 20% and, with particular preference, from 5 to 15% of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, the sum of the mass fractions of components A1 to A5 necessarily being 100%, and by subsequent addition of a second monomer mixture B and further free-radically initiated polymerization of this monomer mixture in the second stage, the mixture of B comprising mass fractions of B1 from 30 to 90%, preferably from 40 to 80% and, with particular preference, from 50 to 75% of olefinically unsaturated monomers selected from vinylaromatic compounds, n-butyl methacrylate and also alkyl esters of α,β-olefinically unsaturated carboxylic acids or dialkyl esters of α,β-olefinically unsaturated dicarboxylic acids, the alkyl groups being selected from linear and branched alkyl groups having up to 3 carbon atoms in the alkyl radical and cyclic and polycyclic alkyl groups having 5 to 15 carbon atoms in the alkyl group, B2 from 10 to 60%, preferably from 20 to 50% and, with particular preference, from 25 to 40% of esters selected from alkyl esters of α,β-olefinically unsaturated carboxylic acids or dialkyl esters of α,β-olefinically unsaturated dicarboxylic acids, the alkyl groups being selected from linear and branched alkyl groups having more than 3 carbon atoms in the alkyl radical, with the exception of n-butyl methacrylate, and B3 from 0 to 40%, preferably from 5 to 30% and, with particular preference, from 10 to 25% of other free-radically polymerizable monomers selected from vinyl esters of aliphatic saturated carboxylic acids having 2 to 18 carbon atoms, hydroxyalkyl esters, nitriles and amides of α,β-unsaturated carboxylic acids, the sum of the mass fractions of components B1 to B3 necessarily being 100%, and the ratio of the mass of the monomer mixture A to the mass of the monomer mixture B is from 50:50 to 95:5, preferably from 60:40 to 90:10.

The copolymers AB obtainable in this way preferably contain, based on the mass of the solids of the dispersion, from 0.2 to 1.7 mol/kg of carbonyl groups and from 0.15 to 1.6 mol/kg of carboxyl groups. The molar amount of the carboxyl groups here is always lower than the molar amount of the carbonyl groups; preferably, the ratio of the molar amount of the carboxyl groups n(—COOH) to the molar amount of the carbonyl groups n(>CO) is from 0.5 to 0.95 mol/mol, with particular preference from 0.75 to 0.9 mol/mol.

The resulting dispersions of the copolymers AB are neutralized following the polymerization by adding ammonia, amines or aqueous alkalis, the amount in which the neutralizing agents are added being such that it is sufficient to neutralize from 0 to 120% of the carboxyl groups present.

To the dispersion neutralized in this way there are subsequently added compounds C having at least two hydrazine or hydrazide groups per molecule, in an amount such that the ratio r of the sum of the molar amount of hydrazine groups n(—NH—NH$_2$) and the molar amount of the hydrazide groups n(—CO—NH—NH$_2$) to the molar amount of the carbonyl groups n(>CO) is from 0.5 to 1.1 mol/mol, preferably between 0.8 and 1.0 mol/mol.

The copolymer dispersions used in the present invention may be prepared by a process in which water, with or without emulsifiers, is introduced as initial charge and heated to the desired reaction temperature, a mixture comprising water, emulsifiers if desired, the monomer mixture A, and a free-radical polymerization initiator is metered in to this initial charge, the polymerization is continued until at least 95% of the monomers have reacted, then a second mixture comprising water, emulsifiers if desired, and also the monomer mixture B and a further free-radically acting polymerization initiator is metered in and the polymerization is subsequently continued until the residual monomer content has fallen below 1%. The resulting dispersion is cooled and admixed, with stirring, with the neutralizing agent, preferably in the form of an aqueous solution. Subsequently, the hydrazine compound or hydrazide compound C is added with stirring to the neutralized dispersion of the copolymer AB to form the self-crosslinking dispersion ABC.

The amines or alkalis used if desired for neutralization improve the stability of the aqueous copolymer dispersions.

Olefinically unsaturated monomers containing carbonyl groups are employed as monomer component A1. Preference is given to the use of linear, branched and cyclic aliphatic compounds having 4 to 20 carbon atoms and each containing at least one carbonyl group and one ethylenic double bond. To a minor extent (up to 10% of the mass of the monomers A1) it is also possible to employ compounds having two or more polymerizable double bonds, which leads to crosslinking of the copolymer. Particular preference is given to the use of α,β-olefinically unsaturated monomers such as N-diacetone(meth)acrylamide and (meth)acrylic acid acetoacetoxyalkyl esters whose alkylene group is selected from 1,2-ethylene, 1,2- and 1,3-propylene, 1,4-butylene and 1,6-hexylene and also 1,5-(3-oxa)pentylene and 1,8-(3,6-dioxa)octylene groups, especially the ethyl esters.

The monomers A2 are preferably α,β-olefinically unsaturated carboxylic acids having 3 to 4 carbon atoms, such as acrylic acid, methacrylic acid, crotonic and isocrotonic acid and also vinylacetic acid. Monoesters of α,β-unsaturated carboxylic acids with linear, branched or cyclic alcohols having 1 to 15 carbon atoms can also be employed, the dicarboxylic acids preferably having 4 to 6 carbon atoms. Preference is given to monomethyl and monoethyl esters of maleic acid, fumaric acid, and also citraconic, mesaconic, itaconic and glutaconic acid.

Of the monomers A3, preference is given to the esters of methanol, ethanol, n- and isopropanol with acrylic and methacrylic acid and to the diesters of said alcohols with the dicarboxylic acids specified under A2, and also to n-butyl methacrylate and, of the vinylaromatic compounds, especially styrene, p-methylstyrene and the isomer mixture known as "vinyltoluene". Particular preference is given to methyl and ethyl (meth)acrylate, n-butyl methacrylate, styrene, and dimethyl maleate.

As monomers A4 it is preferred to employ the esters of n-, sec- and tert-butanol, the isomeric pentanols and the higher alcohols such as n-hexanol and 2-ethylhexyl alcohol with α,β-unsaturated carboxylic acids selected from acrylic and methacrylic acid, vinylacetic acid, maleic acid and fumaric acid; in the case of the dicarboxylic acids referred to, the diesters are used, and n-butyl methacrylate is excluded.

As examples of the hydroxyalkyl esters of olefinically unsaturated carboxylic acids as monomer component A5 mention may be made of hydroxyethyl and 2-hydroxypropyl (meth)acrylate, (meth)acrylonitrile, (meth)acrylamide and, for the vinyl esters, of vinyl acetate.

In the second stage of a polymer having a different chemical structure is produced by adding the monomer mixture B alone or together with new initiators.

The monomers B1 correspond to those specified under A3, the monomers B2 to those specified under A4, and the monomers B3, finally, to those specified under A5. The monomer mixture B is therefore free from compounds having functional groups selected from carbonyl and carboxyl groups.

The compounds C with hydrazine or hydrazide functionality comprise two or more hydrazine or hydrazide groups and preferably have an average molar mass ($M_n$) of less than 1000 g/mol. Examples of such compounds are bishydrazides of dicarboxylic acids having 2 to 12 carbon atoms such as the bishydrazides of oxalic acid, malonic acid, succinic acid, glutaric acid, adipic acid, pinalic acid, suberic acid, azelic acid, sebacic acid or the isomeric phthalic acids; carbonic bishydrazide, alkylene- or cycloalkylene-bissemicarbazides, N,N'-diaminoguanidine, alkylene-bishydrazines such as N,N'-diaminopiperazine, arylenebishydrazines such as phenylene- or naphthylenebishydrazine, and alkylenebissemicarbazides. Compounds C of higher functionality are, for example, the hydrazides of nitrilotriacetic acid or of ethylenediaminetetracetic acid.

Suitable such aqueous acrylic copolymer dispersions can be prepared as known in the art or may be obtained commercially. The aqueous acrylic copolymer dispersions may be essentially completely acrylic, or may contain acrylic functionality in combination with other polymerizable materials, e.g. in the case of aqueous acrylic-modified polyurethane dispersions. Suitable commercial dispersions are available from example from Solutia, under the tradename VIACRYL. For example, VIACRYL 6286, a self-crosslinking, aqueous copolymerisate dispersion containing acrylic esters, may be used in the invention. VIACRYL 6295 may also be used. Additional aqueous copolymer dispersions that may be used include self-crosslinking acrylic modified polyurethane dispersions available from Alberdingk and Boley under the tradenames MAC 25, MAC 34, MAC 35, and MAC 36; acrylic emulsions available from Alberdingk and Boley under the tradenames AC548 and AC2538; an acrylic modified polyurethane disperions available from Alberdingk and Boley under the tradename APU 1062; and aqueous acrylic dispersions available from Avecia under the tradenames Neocryl A6015, A633, A6069, XK12 and XK220.

Preferred aqueous dispersions will contain acrylic copolymer resins having a glass transition temperature ($T_g$) (prior to the crosslinking or cure of the inventive compositions) in the range of about −45° C. to about 40° C. More preferably, the acrylic copolymer resin will have a $T_g$ of less than about 25° C., for example about 5° C. to about 25° C. Most preferably, the acrylic copolymer resin will have a $T_g$ of less than about 15° C., for example about 8° C. to about 15° C.

Generally, the outer layer formed by the aqueous copolymer dispersion will have a thickness in a range of about 0.5 mils to about 3 mils, more typically from about 0.8 mils to about 1.2 mils. Oftentimes the aqueous copolymer composition will contain a coloring agent to impart color to the outer layer of the product. Additionally, the outer layer formed by the aqueous copolymer dispersion may be applied to cover a single side of a finished article (e.g. a skin), or may be applied to the entire surface of a three-dimensional mold so as to completely coat and thereby encapsulate the molded polyurethane product (e.g. in the case of a molded polyurethane foam ball or toy).

After application, the aqueous copolymer dispersion, preferably self-crosslinking, may be allowed to partially or fully cure prior to passage of the polyurethane composition into the mold. Preferably, the polyurethane composition is provided into the mold about 20 seconds to about 5 minutes, more typically about 20 seconds to 2 minutes after the aqueous copolymer dispersion is applied to the mold surface. The polyurethane composition may be applied for example while the aqueous copolymer dispersion is partially cured or fully cured.

The inner polyurethane layer, often a foamed or cellular (including microcellular) substrate, will be formed by spraying or otherwise applying a rapidly reacting composition into the mold and into contact with the surface coating of the aqueous copolymer dispersion. Typically, the rapidly reacting composition contains at least one aromatic polyisocyanate and at least one polyol, which react with each other to form the polyurethane inner layer. This polyurethane inner layer is usually non-light-stable, and possesses elastomeric properties such that the elastomer layer substantially recovers its original dimensions after compression. The aromatic polyisocyanate may also optionally react with one or more components in the aqueous acrylic dispersion, for example components having free hydroxyl groups, such as hydroxylated acrylic esters. This reaction may be useful in chemically bonding the inner layer to the outer layer formed from the aqueous acrylic dispersion.

The present invention is also useful in the preparation of multilayer skins, for example by open-mold spray elastomer processes, or so-called "RIM skin" processes. The resulting skins can then be incorporated as coverings for instrument panels, door panels, seating, or other vehicular components and especially automotive interior components. In open mold spray elastomer processing, the aqueous copolymer dispersion is spray-applied to an open mold, optionally after applying a mold release agent. Thereafter, a sprayable polyurethane elastomer is spray-applied overtop the aqueous copolymer dispersion. The resulting, cured skin can then be removed from the mold and transferred to another operation (e.g. molding) for incorporation into a finished part. Alternatively, the skin may be retained in the mold, and additional processing conducted in the mold, for example the application of a polyurethane foam, and a substrate, to provide a finished part. Similarly, skins can be prepared by a reaction injection molding (RIM) process in which the aqueous copolymer dispersion is applied to a mold surface (optionally after application of a mold release agent), and thereafter a rapid curing polyurethane composition injected into the mold to form the "RIM skin". This skin can then be processed into a finished, automotive interior component. Skins prepared in accordance with the invention by open-mold spray elastomer, RIM skin, or other processing techniques will desirably have a polyurethane layer thickness of about 0.5 to about 2 millimeters, more preferably about 1 millimeter. Further, the elastomeric skin layer will preferably have a density of less than 1000 kg/M$^3$, a Shore A durometer hardness of less than 86, a tensile strength of greater than 8.8 MPas and/or a tear strength of greater than 40 kn/m. The layer thickness resulting from the aqueous dispersion will typically be about 0.5 to about 2 mils, more preferably about 0.8 to about 1.2 mils.

For the purpose of illustrating one embodiment of the invention, description will now be made of the in-mold-coating and reaction injection molding of one exemplary automotive interior part (a steering wheel) in accordance with the invention.

A covered steering wheel may be manufactured using a molding apparatus including first and second portions for forming the back and front sections of the steering wheel, respectively. The first and second mold portions define therebetween an annular cavity formed by their cavity walls and a gate(s) leading to the cavity when they are joined together along a parting line. The first and/or second mold portions may have one or more vent holes formed in its final filling portion which is the last portion to be filled with the polyurethane material.

A material injection mechanism is provided, for injecting the rapidly reacting polyurethane composition into the annular cavity through the gate(s). The mixing head may have a first component or set of components for mixing the materials for preparing the inner-layer-forming polyurethane material (usually a non-light-stable material), and can mix a polyol component, an isocyanate component and any additional components desired.

The process embodying this invention using the above-described molding apparatus will now be described in the order of its steps for the manufacture, by a reaction injection molding (RIM) process, of a two-layer composite for covering a steering wheel.

The first and second mold portions of the mold are separated from each other, and a mold release agent (when used) is applied, such as by spraying, to the cavity walls. Where the aqueous copolymer dispersion contains an appropriate amount of mold release agent, or is otherwise formulated so as not to require the use of a release agent, this step of applying the mold release agent can be omitted. The aqueous copolymer dispersion is then applied to the cavity walls, such as by spraying, to form a film adhering to substantially the entire surfaces of the cavity walls. The aqueous dispersion will also be applied in an amount sufficient to provide the desired cured film thickness for the outer, decorative and/or protective layer of the automotive interior component.

A metal core for a steering wheel is set in the first or second mold portion, and the mold portions are joined together to form the cavity. The components of the mixing head dedicated to the inner polyurethane material are used to combine the polyol component, the isocyanate component, and any other desired components of the material. The polyurethane material is injected through the gate so as to fill the cavity surrounding the metal core and contact the film formed from the aqueous dispersion. After curing, the first and second mold portions are separated from one another, the coated automotive steering wheel is removed from the mold, and any flash is removed, to provide the finished component. With reference to FIG. 1, the resulting in-mold-coated steering wheel 10 has an outer layer or covering 11 formed by the aqueous copolymer dispersion and adhered to the inner polyurethane layer 12, both of which cover the metal core 13 of the steering wheel 10.

In accordance with one embodiment of the invention, multiple aqueous dispersed compositions containing different coloring agents can be applied to different portions of the automotive interior article to produce discretely masked colors. It has been discovered that such processes can be conducted wherein subsequent aqueous dispersions can be applied to previously-applied dispersion while still wet, enabling for example wet-on-wet (WOW) and wet-on-wet-on-wet (WOWOW) processing.

The optional additives in the aqueous-dispersed composition used to form the outer layer can include, without limitation, any combination of the following: heat and ultra-violet light stabilizers, pH stabilizers to maintain an alkaline state of dispersion, plasticizers, antioxidants, dulling or flatting agents, surfactants, colloidal protectants to maintain particles in suspension, flow additives, colorants such as organic and inorganic pigments, carbon black, thixotropic agents (e. g., hydroxy methyl cellulose), abrasion resistance agents such as wax dispersions, and fillers such as clay particles.

The overall aqueous-dispersed composition can contain, for example, about 15% to about 60% resin solids by weight, more preferably about 20% to about 50% resin solids by weight, and about 85% to about 40% water by weight, more preferably about 80% to about 50% water by weight. The aqueous-dispersed composition may also contain smaller amounts of organic solvents, for example up to about 10% solvents by weight, e.g. about 0.5% to about 10% solvents by weight, depending on desired color, additives, and other similar factors. Compositions of the invention may include one, two, or more curable resins as described herein, and in advantageous such embodiments include no external crosslinking agents (i.e. crosslinking of the composition is achieved by one or more of the curable resin components). In particularly preferred aspects of the invention, the overall aqueous-dispersed composition will constitute a one-component composition, thus having only a single curable resin component, potentially combined with other conventional additives as disclosed herein.

Preferred overall aqueous acrylic coating compositions used in the invention will also contain no or only low levels of higher boiling solvents that are slow in evaporating from the film applied to the mold surface and are deleterious to the outer coating and/or inner polyurethane layer. For example, commercial aqueous polyurethane dispersions commonly contain substantial levels of n-methyl pyrrolidinone (NMP), which evaporates very slowly from applied films. As a result, mold temperatures must be increased, if possible, and/or longer solvent flash times are necessary, to remove NMP from the film that would otherwise cause undesirable blistering of the outer coating layer of the vehicular component. Preferred overall aqueous coating compositions will thus include no greater than about 10% organic solvent having a boiling point in excess of about 180° C. and/or an evaporation rate less than 0.03 (where n-butyl-acetate=1), more preferably no more than about 5% by weight of such solvent(s), and most preferably no more than about 3% by weight of such solvent(s). Preferred overall aqueous coating compositions used in the invention will contain no more than about 2.5% by weight NMP, more preferably no more than about 1% by weight NMP, and will most preferably be free or essentially free of NMP.

Exemplary polyisocyanates that can be selected for the polyurethane composition employed to prepare the inner layer include both aromatic and aliphatic diisocyanates, including diisocyanates having aromatic closed-ring structures, such as diphenylmethane diisocyanate prepolymer (MDI prepolymer), which can be obtained from BASF Corp. of Wyandotte, Mich. under the trade designation ELASTOLIT M50555T, ISOCYANATE, NPU U05275, or diphenylmethane-4,4'-diisocyanate (MDI), or mixed isomers of MDI or mixtures of the above, which are available from BASF or Dow Chemical Corp. of Midland, Mich., Mobay (Bayer) Chemical Corp. of Baytown, Tex., or ICI America of Geismar, La. The above-mentioned non-light-stable aromatic polyisocyanates are very desirable for use in the inner layer in view of the higher rate of reactivity and completion of property development and better physical properties (e. g., tensile strength, elongation, and tear strength) of these non-light-stable aromatic polyisocyanate when compared to light-stable aliphatic-based isocyanates such as isophorone diisocyanates, in which the—NCO groups are sterically hindered due to their spatial arrangement at either end of the molecule. By contrast, the aromatic diisocyanates used in this invention preferably have —NCO groups directly attached to the aromatic ring. In this preferred embodiment, the aromatic diisocyanates yield faster rates of reaction because of the arrangement and reactivity of the —NCO groups on the aromatic ring structure (e. g., in diphenylmethane diisocyanate) and the availability of the —NCO groups for reaction with the hydrogen donors of the —OH type residing on the organic chain of the polyols of the rapidly reacting composition.

Suitable polyols for the rapidly reacting composition include, without limitation, polyether polyols having average molecular weights in a range of from about 200 to about 2000 and containing one or more pendent hydroxyl and/or carboxyl groups in addition to primary hydroxyl groups which can chemically react with unreacted functional —NCO groups of the blocked, heat-activated aliphatic diisocyanate. An exemplary polyol is ELASTOLIT M50555R NPU U05274 from BASF Corp. of Wyandotte, Mich.

The rapidly reacting composition can also contain appropriate additives, including, by way of example and without limitation, any combination of the following: heat and ultraviolet light stabilizers, pH stabilizers, antioxidants, dulling agents, surfactants, carbon black, chain extenders (e. g., ethylene glycol), thixotropic agents (e. g., amorphous silica), fillers such as clay particles, and catalysts such as tin catalysts (e. g., dibutyltin dilaurate).

Various blends of polyether polyols and polyisocyanates having suitable resilience properties can be employed to form the polyurethane inner layer. For example, the polyisocyanate blend can include methylene diisocyanate. The polyurethane of the inner layer can also contain appropriate additives, including, by way of example and without limitation, any combination of the following: surfactants, antioxidants, fillers, stabilizers, catalysts such as tin catalysts (e. g., dibutyl tin dilaurate) and amines (e. g., diethanolamine), and small amounts of foaming agents such as water. In this regard, it is noted that in some embodiments of the present invention, the condensation reaction between the blends of polyols and polyisocyanates releases water, which reacts with the polyisocyanate to generate carbon dioxide and thereby impart the cellular structure to the inner polyurethane layer. Accordingly, a slightly stoichiometric excess of polyol can be provided to form a semi-rigid polyurethane cellular foam when desired.

Additional information regarding compositions that are useful in forming the inner layer of skins and the like is found in U.S. Patent Publication No. 2002001722 A1 dated Jan. 3, 2002 and publishing U.S. patent application Ser. No. 09/124,328 filed Jul. 29, 1998, which is hereby incorporated herein by reference.

The rigid core or substrate of the automotive interior component can be selected from any material possessing the requisite strength to reinforce and mount the outer layer and inner layer. Suitable materials include polyolefins, such as polypropylene and ethylene-propylene copolymers, thermoplastic olefins (TPOs), and thermoplastic polyolefin elastomers (TPEs). In some instances where even higher levels of performance are required, engineering thermoplastics may be selected. These include injection molding thermoplastics, such as acrylonitrile butadiene styrene (ABS), polycarbonate (PC), a PC/ABS alloy, thermoplastic polyurethane (TPU), styrene maleic anhydride (SMA), and reaction injection molded polyurethanes (RRIM). Other materials, such as metals, metal alloys, wood-fiber composites, or any combination thereof, can also be used.

Although the method of the present invention has been embodied above in connection with the preparation of a steering wheel, it is understood that the method is equally applicable to other structures, including for example panel structures, e.g. instrument panels, armrests, headrests, floor consoles, knee bolsters, airbags and glove compartment doors.

For the purpose of promoting a further understanding of the present invention and its features and advantages, the following specific Examples are provided. It will be understood that this Examples are illustrative, and not limiting, of the present invention.

EXAMPLE 1

Preparation of In-Mold Coating

A coating composition was prepared having the following formulation:

| a. | Viacryl 6286 (aqueous copolymerisate dispersion comprised of acrylic esters and a small amount of styrene) | 66.55% |
|---|---|---|
| b. | Microspersion 190 (wax dispersion providing abrasion resistance) | 2.51% |
| c. | Pergopak M3 (flattener) | 1.40% |
| d. | Water | 27.95% |
| e. | Secondary n-Butanol | .56% |
| f. | Acrysol RM825 (thickening agent) | .18% |
| g. | Surfynol 104BC (flow additive) | .84% |

Color was added using a universal tinting system available from Red Spot Paint & Varnish Co., Evansville, Ind., U.S.A.

The above composition was prepared by adding the Viacryl 6286 resin to a clean formulation tank, and then sifting in the Microspersion 190 under agitation and mixing for 15 to 20 minutes. Care was taken to be sure that the wax dispersion was dispersed and exhibited no settling before it addition. The Pergopak M3 flattener was then sifted in under agitation, and cut in for 30 minutes to ensure proper dispersion. The water and butanol were premixed together in a separate container, gently stirred, and then added to the formulation tank. The Acrysol RM 825 and Surfynol 104 BC were then slowly added under agitation, and mixing was continued for 15 to 20 minutes. Red Spot's Universal Tints were added for color.

The resulting composition is highly useful for in-mold-coating applications to form outer decorative and/or protective layers of multilayer composites for covering automotive interior components. The materials in particular demonstrates excellent adhesion to inner polyurethane layers of such components.

The invention has been described above in detail, with specific reference to its preferred embodiments. It will be understood, however, that a variety of modifications and additions can be made to the procedures disclosed without departing from the spirit and scope of the invention. Such modifications and additions are desired to be protected. In addition, all publications cited herein are indicative of the level of skill in the relevant art, and are each hereby incorporated by reference each in their entirety as if individually incorporated by reference and fully set forth.

What is claimed is:

1. An in-mold coated vehicular component, comprising:
a vehicular component having a molded inner polyurethane layer;
a coating adhered to said inner polyurethane layer; and
wherein said coating is formed in-mold with said polyurethane layer and is comprised of the reaction product of an aqueous acrylic copolymer dispersion, wherein said coating comprises a textured surface, wherein said copolymer has a core and shell, and wherein said copolymer has a $T_g$ of less than about 25° C.

2. The in-mold coated vehicular component of claim 1, wherein said aqueous acrylic copolymer dispersion comprises acrylic esters.

3. The in-mold coated vehicular component of claim 1, wherein said copolymer has a $T_g$ of about 5° C. to about 25° C.

4. The in-mold coated vehicular component of claim 1, wherein said copolymer has a $T_g$ of less than about 15° C.

5. The in-mold coated vehicular component of claim 4, wherein said copolymer has a $T_g$ of about 8° C. to about 15° C.

6. The in-mold coated vehicular component of claim 1, wherein said copolymer has a $T_g$ of about −45° C. to about 40° C.

* * * * *